US006308663B1

(12) United States Patent
Philen et al.

(10) Patent No.: US 6,308,663 B1
(45) Date of Patent: Oct. 30, 2001

(54) ANIMAL WALKING AND TRAINING COLLAR

(76) Inventors: Dana R. Philen, deceased, late of Atlanta, GA (US); by Dan L. Philen, legal representative, 2801 Hawthorne Dr., Atlanta, GA (US) 30345

( * ) Notice: Subject to any disclaimer, the term of this patent is extended or adjusted under 35 U.S.C. 154(b) by 0 days.

(21) Appl. No.: 09/545,050

(22) Filed: Apr. 7, 2000

Related U.S. Application Data

(60) Provisional application No. 60/133,604, filed on May 11, 1999.

(51) Int. Cl.[7] .................................................. A01K 15/00
(52) U.S. Cl. .......................... 119/864; 119/863; 119/865
(58) Field of Search .................................. 119/864, 865, 119/863, 856

(56) References Cited

U.S. PATENT DOCUMENTS

| 2,458,489 | * | 1/1949 | Hallander . | |
|---|---|---|---|---|
| 2,614,533 | | 10/1952 | Elsinger ................................ | 119/106 |
| 2,859,732 | * | 11/1958 | Driscoll . | |
| 3,995,598 | | 12/1976 | Gardner et al. ....................... | 119/106 |
| 4,811,695 | | 3/1989 | Higgins ................................. | 119/106 |
| 4,924,815 | | 5/1990 | Halla .................................... | 119/106 |
| 4,964,369 | * | 10/1990 | Sporn ................................... | 119/864 |
| 5,383,426 | | 1/1995 | Krauss ................................. | 119/793 |
| 5,511,515 | | 4/1996 | Brown et al. ......................... | 119/771 |
| 5,598,812 | * | 2/1997 | Graham et al. ....................... | 119/770 |

* cited by examiner

*Primary Examiner*—Charles T. Jordan
*Assistant Examiner*—Yvonne R. Abbott
(74) *Attorney, Agent, or Firm*—Thomas, Kayden, Horstemeyer & Risley LLP

(57) ABSTRACT

A collar having a variable circumference for walking and training a domestic animal. In one embodiment, the collar comprises a strap portion and a first and second coupler being attached to opposing ends of the strap portion. A reducer assembly having a first end being movably attached to the first coupler and a second end being connected to the second coupler such that the reducer assembly remains connected the strap portion. The collar further comprises a trainer fastener attached to the reducer assembly and a walker fastener attached to the strap portion. The trainer fastener is arranged and configured to receive a leash such that the circumference of the collar is variable. The walker fastener is arranged and configured to receive a leash such that the circumference of the collar is fixed.

10 Claims, 3 Drawing Sheets

ANIMAL WALKING AND TRAINING COLLAR

CLAIM OF PRIORITY

This application claims priority to copending U.S. provisional application entitled, "Walking and Training Apparatus and Method," having Ser. No. 60/133,604, filed May 11, 1999, which is entirely incorporated herein by reference.

TECHNICAL FIELD

The present invention is generally related to collars for domestic animals and, more particularly, is related to a collar for walking and training a domestic animal.

BACKGROUND OF THE INVENTION

Ever since people have kept and maintained domestic animals, such as dogs, in society there has existed the issue of maintaining control of the animals while walking them as well as while effectively training the animals. For both walking and training dogs, the animal is usually tethered on a leash which can be held by a person both to lead the animal and prevent the animal from wandering too far away from the person. To attach a leash to the animal, a harness or collar is typically used.

When walking a dog, for example, a collar of a simple band, or the like, is typically used. A typical walking collar is placed around the dog's neck and fastened to a circumference such that the collar will not slip off of the dog's neck but also does not choke the dog. Such walking collars are typically fixed to and maintain one size, or circumference, during the use of the collar, thereby preventing the collar from tightening. When training a dog, however, it is desirable for the trainer to have an immediate method for physically communicating with the animal. As such, collars that have a variable circumference such that the collar tightens around the dog's neck as the dog pulls against the leash are typically used for training. Since these two very different collars are desirable for the two different exercises of walking and training dogs, dog owners and/or trainers will typically have at least two collars, a walking collar and a training collar to purchase, use, and keep readily available.

Therefore, it is desirable to have one collar that can be placed around a dog's neck such that the circumference of the collar around the dog's neck can be either fixed, or variable, as the dog pulls against the leash attached to the collar. As such, it is desirable to have one collar that can be used as either a walking collar or a training collar.

Thus, a heretofore unaddressed need exists in the industry to address the aforementioned deficiencies and inadequacies.

SUMMARY OF THE INVENTION

The present invention is a collar having a variable circumference for walking and training a domestic animal. In one preferred embodiment, the collar comprises a strap portion and a first and second coupler being fixed to opposing ends of the strap portion. A reducer assembly is connected to the strap portion such that a first end of the reducer assembly is movably attached to the first coupler and a second end of the reducer assembly is connected to the second coupler. The collar further comprises a trainer fastener attached to the reducer assembly and a walker fastener attached to the strap portion. The trainer fastener is arranged and configured to receive a leash and is attached to the reducer assembly such that when the leash is attached to the trainer fastener the circumference of the collar decreases as a force, generated from either the trainer or the animal pulling against the leash, is applied by the leash. The walker fastener is arranged and configured to receive a leash and is attached to the strap portion of the collar such that when the leash is attached to the walker fastener the circumference of the collar does not decrease as a force, generated from either the trainer or the animal pulling against the least, is applied by the leash. Thus the single collar has a reducible diameter function for training the dog and a fixed diameter portion for walking the dog, depending upon where the leash is attached to the collar.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
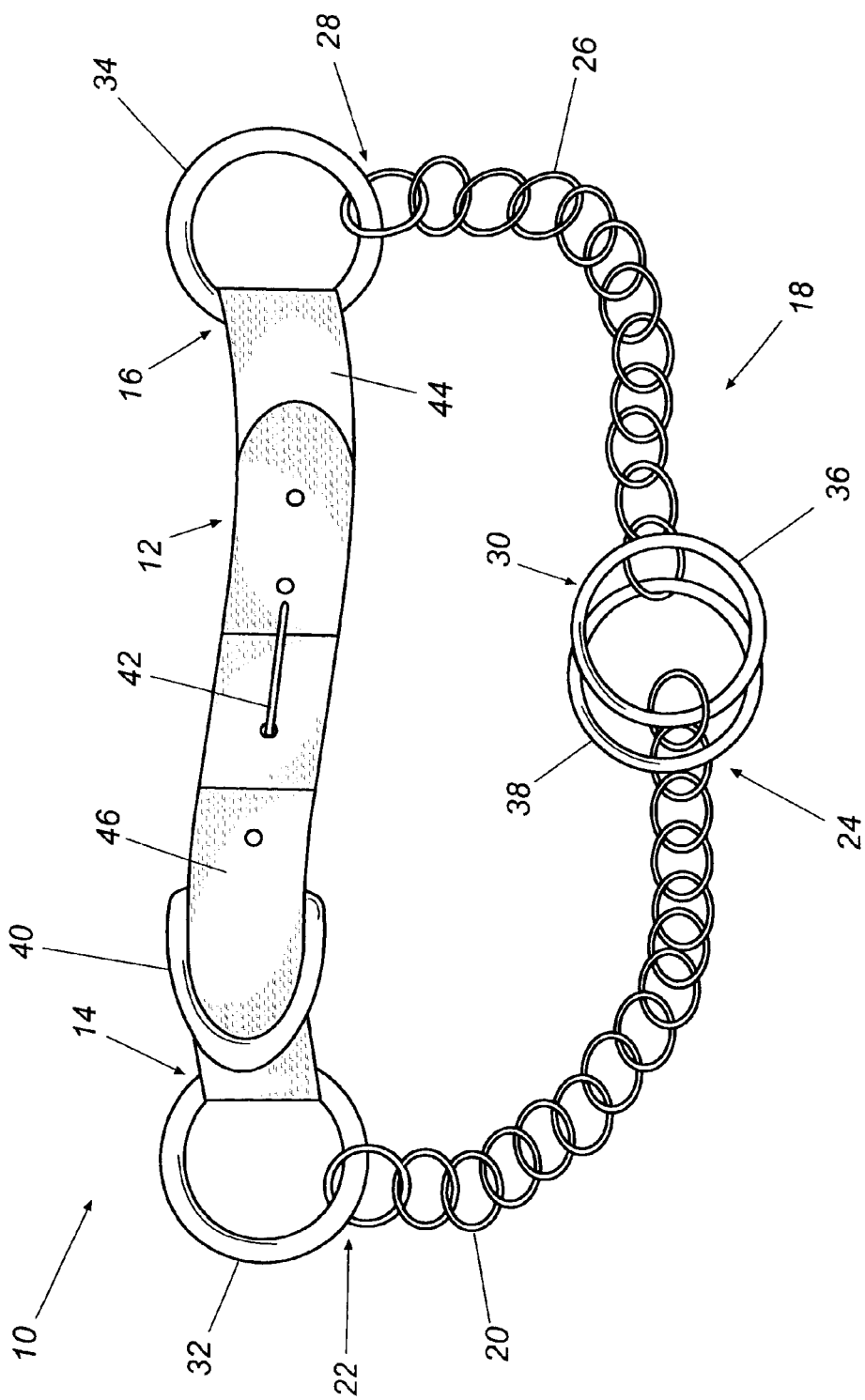
FIG. 1 is an illustration of the first preferred embodiment of the present invention.

FIG. 1 illustrates a first preferred embodiment of the present invention which constitutes a collar 10 for walking and training a domestic animal. The collar 10 is arranged and configured to engage, by completely encircling, the neck of a domestic animal, preferably a dog, without slipping off over the animal's head. The collar 10 includes a strap portion 12 defined by a first end 14 and a second end 16. The first end 14 of the strap portion 12 includes a first coupler 32 movably attached thereto. Although the first coupler 32 preferably comprises a metal ring, a D-ring, or the like, it can comprise any material or shape that is suitable to fix the strap portion 12 to the reducer 18. The first coupler 32 can be attached to the strap portion 12 by passing a section of the strap portion 12 through the first coupler 32 and doubling the strap portion 12 back over itself and affixing the touching portions of the strap portion 12 together. The portions of the strap portion 12 being in contact can be fixed together by adhesive, stitching or any suitable means. The first coupler 32 additionally has fixed thereto a first portion 20 of a reducer 18. The first portion 20 comprises an attachment end 22 and a free end 24, wherein the attachment end 22 of the first portion 20 is movably attached to the first coupler 32. The free end 24 has swivelly joined thereto a trainer fastener 36. The second end 16 of the strap portion 12 includes a second coupler 34 movably attached thereto. Similar to the first coupler 32, the second coupler 34 preferably comprises a metal ring, a D-ring, or the like, but can comprise any material or shape that is suitable to attach the strap portion 12 to the reducer 18. The second coupler 34 can be attached to the strap portion 12 in a similar manner as described above for attaching the first coupler 32 to the first end 14 of the strap portion 12. The second coupler 34 is configured to receive an attached end 28 of a second portion 26 of the reducer 18. A free end 30 of the second portion 26 of the reducer 18 has a stop 38 attached thereto. The stop 38 is configured to allow the free end 24 of the first portion 20 of the reducer 18 to pass freely therethrough until the stop 38 engages the trainer fastener 36. The stop 38 preferably comprises a metallic ring and is configured such that the trainer fastener 36 cannot pass therethrough. Sliding the first portion 20 of the reducer 18 through the stop 38 such that the trainer fastener 36 moves away from the stop 38, results in decreasing the circumference of the collar 10. The reducer 18 preferably comprises a metal link chain, however, the reducer 18 may comprise any suitable material arranged in a substantially elongated configuration. The strap portion 12 further includes a walker fastener 40 pivotally attached thereto. The walker fastener 40 preferably comprises a metal ring or D-ring, however, it can comprise any suitable material or configuration. It is further preferred that the walker fastener 40 is attached to the strap portion 12 such that lateral movement along the strap portion 12 is prohibited. In one preferred embodiment, the strap portion 12 comprises a first portion 46 and a second portion 44, which can be joined by a fastening means 42. The fastening means 42 can comprise a buckle, a snap, a hook and loop fastener, or any other suitable means for releasably engaging the first portion 44 with the second portion 46. When the first portion 44 and the second portion 46 are fastened together by the fastening means 42, the collar 10 preferably fits around an animal's neck. When the first portion 44 and the second portion 46 of the strap portion 12 are disconnected from each other, by releasing the fastening means 42, the collar 10 can easily be placed on or removed from the animal's neck. The strap portion 12, preferably comprises a substantially flexible nylon material having a width effective in distributing pressure applied to the animal's neck evenly without cutting into the animal's skin.

In a first preferred method of use for the embodiment illustrated in FIG. 1, the collar 10 can be used interchangeably as a collar for walking a domestic animal, such as a dog, or a training collar, typically used for training a domestic animal. For either use, the collar 10 can be positioned around an animal's neck by releasing the fastening means 42 and detaching the first portion 44 from the second portion 46. The collar 10 can then be positioned around the animal's neck and the first portion 44 and the second portion 46 of the strap portion 12 can be rejoined and fixed together by the fastening means 42. To use the collar 10 as a walking collar, a collar that does not tighten around the animal's neck (decrease in circumference) as a result of a pulling force applied to a portion of the collar 10, a leash (not shown) can be attached to the walker fastener 40. In this configuration, the circumference of the apparatus 10 will maintain a maximum circumference upon encountering a pulling force by the animal or leash holder, as a result of the stop 38 engaging the trainer fastener 36. To use the collar 10 as a training collar, a collar where the circumference varies, the collar 10 tightens as a result of a pulling force by the animal or individual holding the leash during use, the collar 10 can be positioned around the animal's neck in a similar fashion as described above, and a leash (not shown) can be attached to the trainer fastener 36. In this method of use, the free end 24 of the first portion 20 of the reducer 18 is free to pass through the stop 38. As such, with increased pulling by the animal or leash holder, the leash will pull the free end 24 of the first portion 20 further through the stop 38, thereby reducing the circumference of the collar 10, and applying a choking pressure to the animal. It should be noted that when implemented as a walking collar, the collar 10 will be arranged on the animal such that the reducer 18 is adjacent the animal's throat and the strap portion 12 is adjacent the back of the animal's neck. Although the reducer portion 18 preferably comprises material that is less effective at comfortably distributing force on the animal's throat, since little pressure is applied in this use, this will have no effect on the animal. However, when the collar 10 is implemented as a training collar, a collar allowing the circumference to decrease, increased pressure is applied to the animal's throat, the collar 10 will be arranged on the animal such that the strap portion 12 is adjacent the animal's throat and the reducer 18 is adjacent the back of the animal's neck. In this configuration, the strap portion 12 advantageously distributes the forces applied to the animal's throat to prevent the collar 10 from cutting into the animal's skin.

Figure 2:
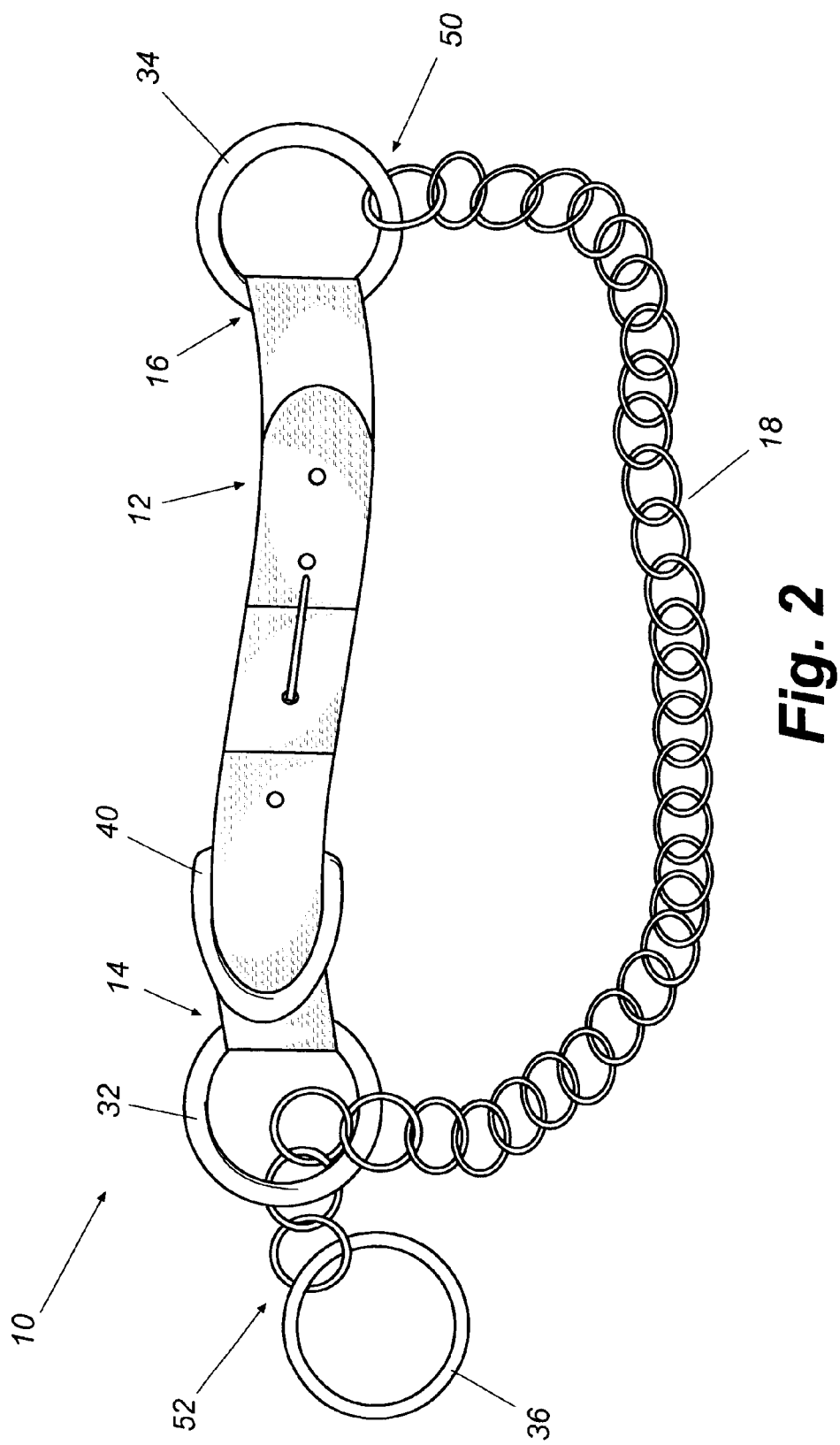
FIG. 2 is an illustration of the second preferred embodiment of the present invention.

FIG. 2 illustrates a second preferred embodiment of the present invention. The collar 10 comprises a strap portion 12 and a reducer 18. The reducer 18 is attached to the strap portion 12 by a second coupler 34 attached to a second end 16 of the strap portion 12. The second coupler 34 can be attached to the strap portion 12 by passing a portion of the strap portion 12 through the second coupler 34 and doubling the strap portion 12 back over itself and affixing by stitching, adhesives or any other attaching means, the touching portions of the strap portion 12 together. The reducer 18 comprises an attached end 50 and a free end 52, where the attached end 50 is attached to the second coupler 34. The free end 52 of the reducer 18 has a trainer fastener 36 attached thereto. A first coupler 32 is attached to a first end 14 of the strap portion 12. The first coupler 32 can be attached to the strap portion 12 in a similar manner as the second coupler 34 is attached to the strap portion 12, or by any suitable means. The first coupler 32 is configured to receive the free end 52 of the reducer 18 and to prevent the trainer fastener 36 from passing therethrough. A walker fastener 40 is pivotally attached to the strap portion 12.

In use, the collar 10 of the second preferred embodiment, illustrated in FIG. 2, can be used interchangeably as a walking collar or a training collar. Similar to the method of use as a walking collar for the first preferred embodiment illustrated in FIG. 1, the collar 10 is opened to be placed on the animal's neck by disconnecting the first portion 44 of the strap portion 12 from the second portion 46 of the strap portion 12 by releasing the fasting means 42. The collar 10 can be placed around the animal's neck and the first portion 44 and the second portion 46 of the strap portion 12 fixed together by the fastening means 42. When used as a walking collar, the collar 10 is attached to a leash (not shown) at the walker fastener 40. As a pulling force is applied to the leash, either by the leash holder or the animal, the collar 10 extends to its full circumference, where the trainer fastener 36 engages the first coupler 32.

Since the trainer fastener 36 cannot pass through or beyond the first coupler, the second preferred embodiment can also be used as a training collar. For this use, the collar 10 can be placed around the animal's neck in a similar fashion as disclosed above, and a leash (not shown) can be attached to the trainer fastener 36. As a pulling force is applied to the trainer fastener 36 by the leash, the reducer 18 is pulled through the first coupler 32, thereby reducing the circumference of the collar 10. Use of the second configuration as a walker collar and a training collar result in substantially similar placement configurations on the animal's neck, as discussed above.

Figure 4:
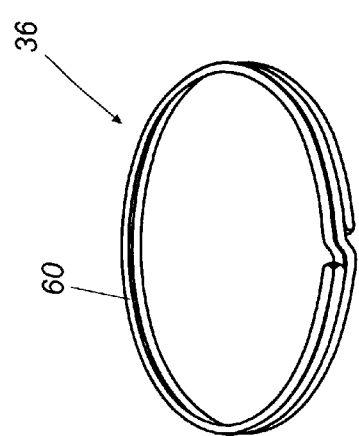
FIG. 4 is an illustration of a preferred spiral ring for use with the present invention.
Figure 3:
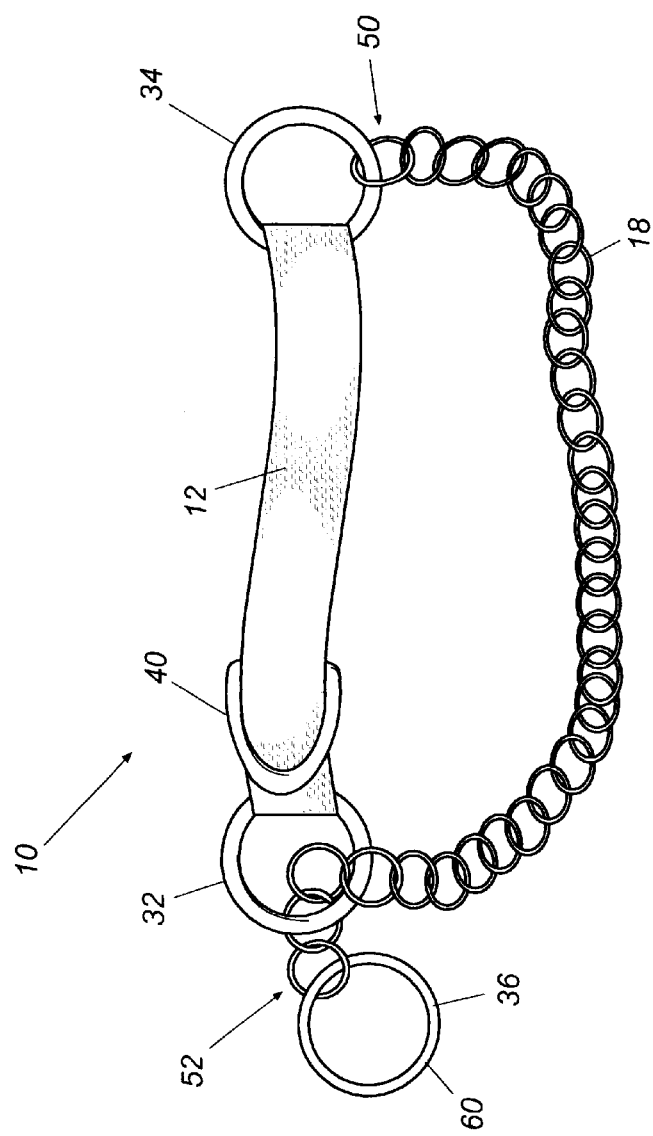
FIG. 3 is an illustration of the third preferred embodiment of the present invention.

In a third preferred embodiment of the present invention, illustrated in FIG. 3, the strap portion 12 comprises a one-piece continuous member. In this configuration, the collar 10 is placed on and removed from the animal's neck preferably by first removing the trainer fastener 36 from the free end 52 of the reducer 18 and then passing the free end 52 of the reducer 18 fully through the first coupler 32 such that the reducer 18 is disengaged from the first coupler 32. As such, the free end 52 of the reducer 18 is preferably releasably engaged by the trainer fastener 36 which, preferably, comprises a spiral, or split, ring 60 (FIG. 4), or the like, such that the trainer fastener 36 can be readily removed from the free end 52 of the reducer 18 to facilitate passing the free end 52 through the first coupler 32. The collar 10 can then be placed around the animal's neck and the free end 52 of the reducer 18 passed through the first coupler 32 and the trainer fastener 36 re-affixed to the free end 52 of the reducer 18. In this embodiment as well, the trainer fastener 36 is prevented from passing through the first coupler 32. It should be understood that either configuration of the reducer 18 (comprising one portion or two portions) can be coupled with either configuration of the strap portion 12 (comprising one portion or two portions) to assemble a collar 10 which embodies the spirit of the present invention.

The method of use of the third preferred embodiment of the present invention is also interchangeable between a collar for walking an animal and a collar for training an animal. The implementation and placement configuration on the animal's neck of both of these uses is similar to those discussed for the use of the second preferred embodiment.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A collar having a variable circumference for walking and training a domestic animal, said collar being arranged to engage the neck of the domestic animal, said collar comprising:
   a strap portion having a first end and second end;
   a first coupler being attached to said first end of said strap portion;
   a second coupler being attached to said second end of said strap portion;
   a reducer assembly having a first end and a second end, said first end being a free end arranged and configured to be engaged by said first coupler and said second end being connected to said second coupler, wherein said reducer assembly remains connected to said strap portion;
   a trainer fastener being attached to said reducer assembly, such that a force pulling against said trainer fastener results in said collar reducing circumference, said trainer fastener being arranged and configured to receive a leash; and
   a walker fastener being attached to said strap portion, such that a force pulling against said walker fastener results in said collar increasing to a maximum circumference, said walker fastener being arranged and configured to receive a leash.

2. The apparatus of claim 1, wherein said strap portion further comprises:
   a first portion;
   a second portion; and
   a fastening means, said fastening means releasably fixing said first portion to said second portion.

3. The apparatus of claim 2, wherein said fastening means comprises a hook and loop fastener.

4. The apparatus of claim 2, wherein said fastening means comprises a buckle.

5. The apparatus of claim 1, wherein said first coupler and said second coupler each comprises a D-ring.

6. The apparatus of claim 1, wherein said trainer fastener comprises a spiral ring.

7. The apparatus of claim 1, wherein said strap portion comprises a substantially flexible fabric.

8. The apparatus of claim 1, wherein said reducer comprises a chain.

9. The apparatus of claim 1, wherein said reducer assembly further comprises:
   a first portion having an attached end and a free end, said attached end being movably attached to said first coupler;
   a second portion having an attached end and a free end, said attached end being movably attached to said second coupler, and
   a stop being attached to said free end of said second portion, said stop having said free end of said first portion and said trainer fastener threaded therethrough, said stop being configured to engage said trainer fastener;
   wherein said trainer fastener is movably attached to said free end of said first portion.

10. A collar having a variable circumference for walking and training a domestic animal, said collar being arranged to engage the neck of the domestic animal, said collar comprising:
    a strap portion having a first end and second end;
    a first coupler being attached to said first end of said strap portion;
    a second coupler being attached the said second end of said strap portion;
    a reducer assembly having a first end and a second end, said first end being movably attached at said first coupler and said second end being connected to said second coupler, wherein said reducer assembly remains connected to said strap portion, said reducer assembly comprising:
       a first portion having an attached end and a free end, said attached end being movably attached to said first coupler;
       a second portion having an attached end and a free end, said attached end being movably attached to said second coupler; and
       a stop being attached to said free end of said second portion, said stop having said free end of said first portion and a trainer fastener threaded therethrough, said stop being configured to engage said trainer fastener;
    wherein said trainer fastener is movably attached to said free end of said first portion;
    said trainer fastener being attached to said reducer assembly, such that a force pulling against said trainer fastener results in said collar reducing circumference, said trainer fastener being arranged and configured to receive a leash; and walker fastener being attached to said strap portion, such that a force pulling against said walker fastener results in said collar increasing to a maximum circumference, said walker fastener being arranged and configured to receive a leash.

* * * * *

UNITED STATES PATENT AND TRADEMARK OFFICE
CERTIFICATE OF CORRECTION

PATENT NO. : 6,308,663 B1 Page 1 of 1
DATED : October 30, 2001
INVENTOR(S) : Dana R. Philen It is certified that error appears in the above-identified patent and that said Letters Patent is hereby corrected as shown below:

<u>Title page,</u>
Item [76], Inventors, after "Inventors: "Dana R. Philen", delete "deceased, late".

Signed and Sealed this

Thirteenth Day of August, 2002

Attest:

Attesting Officer

JAMES E. ROGAN
*Director of the United States Patent and Trademark Office*